United States Patent [19]

F'Geppert

[11] 4,362,326
[45] Dec. 7, 1982

[54] DISCONNECTABLE COUPLING

[75] Inventor: Erwin F'Geppert, Novi, Mich.

[73] Assignee: The United States of America as represented by the Secretary of the Army, Washington, D.C.

[21] Appl. No.: 230,922

[22] Filed: Feb. 2, 1981

[51] Int. Cl.³ .............................................. F16L 37/08
[52] U.S. Cl. ...................................... 285/315; 285/321
[58] Field of Search .................. 285/66, 70, 315, 316, 285/67, 321; 137/614.04; 403/322

[56] References Cited

U.S. PATENT DOCUMENTS 2,257,321 9/1941 Arnold .................................. 285/67
2,819,914 1/1958 Eitner .................................. 285/70
3,168,335 2/1965 Sumption ............................ 285/70
3,566,918 1/1971 Rauen ............................ 137/614.04

Primary Examiner—Dave W. Arola
Attorney, Agent, or Firm—Peter A. Taucher; John E. McRae; Nathan Edelberg

[57] ABSTRACT

A disconnectable tube-to-tube coupling that includes a locking collar arranged to span two radially-projecting rings carried by end fittings on the tubes. A special cam-like depresser sleeve is slidably arranged on the collar to move one of the rings into a groove in its end fitting, thereby breaking the coupling connection. The sleeve is operated by mechanical or manual force applied in the axial direction.

4 Claims, 4 Drawing Figures

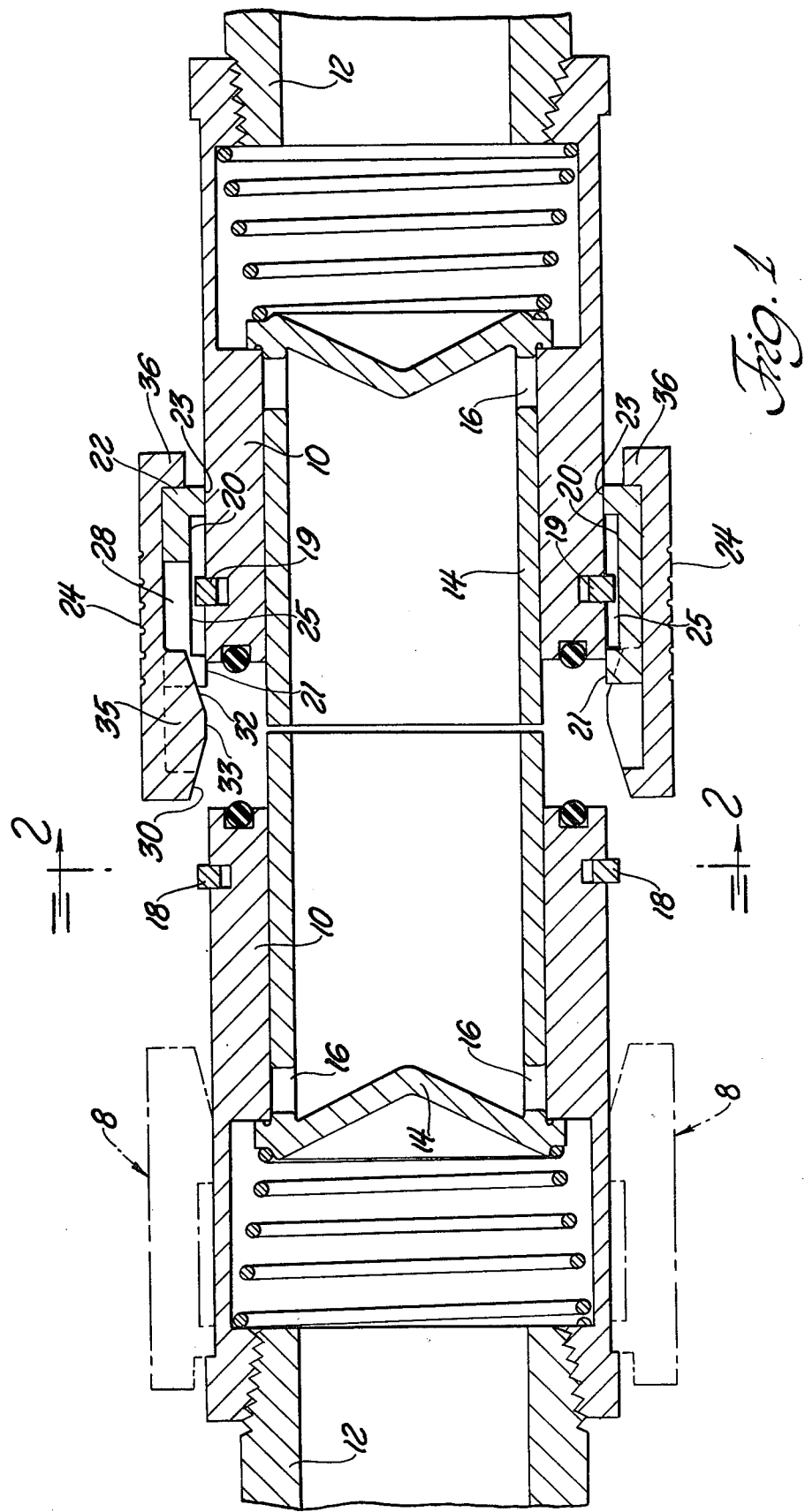

DISCONNECTABLE COUPLING

The invention described herein may be manufactured, used, and licensed by or for the Government for governmental purposes without payment to me of any royalty thereon.

BACKGROUND AND SUMMARY

This invention relates to a disconnectable tube-to-tube coupling of the type shown for example in U.S. Pat. No. 2,257,321 to Arnold, or U.S. Pat. No. 2,819,914 to Eitner, or U.S. Pat. No. 3,566,918 to Rauen. My invention aims to provide a coupling that uses a number of common parts, hence relatively few different parts. Another aim of my invention is to provide a disconnectable coupling that can be operated in the "separate" or "connect" directions by a straight axial push, rather than a combined push and turn action that is required in many conventional couplings. The straight push is more easily accomplished by unskilled technicians, with lessened possibility that the coupling will be left in a partially-connected condition. Also, the straight push action can, if necessary, be accomplished from a remote location via a cable or lanyard connection; combined push-turn actions are not easily accomplished from remote locations.

My coupling can be designed with parts redundancy whereby both halves have exactly the same construction, thus enabling he human technician to operate the coupling with either the left hand or the right hand. The parts redundancy also provides a built-in spare parts feature that prolongs the service life in spite of wear or abuse. The spare parts concept also avoids the impossible-to-solve situation of connecting two male fittings or two female fittings; my coupling can be considered a hermaphrodilic coupling.

THE DRAWINGS

FIG. 1 is a longitudinal sectional view taken through a disconnectable coupling embodying my invention.

Referring in greater detail to the drawings, there is shown a coupling assembly for releasably joining two fluid tubes 12 in flow-conducting relationship. The coupling assembly could be used for joining other types of tubes such as tubular electrical cables. The coupling assembly includes two similar end connectors 10 carried by respective ones of tubes 12 for relative axial movement from the separated positions of FIG. 1 to the joined positions of FIGS. 3 and 4. Each connector contains a spring-urged check valve 14 that is automatically moved to the FIG. 4 flow-open position when the end connectors are abutted together.

Figure 3:
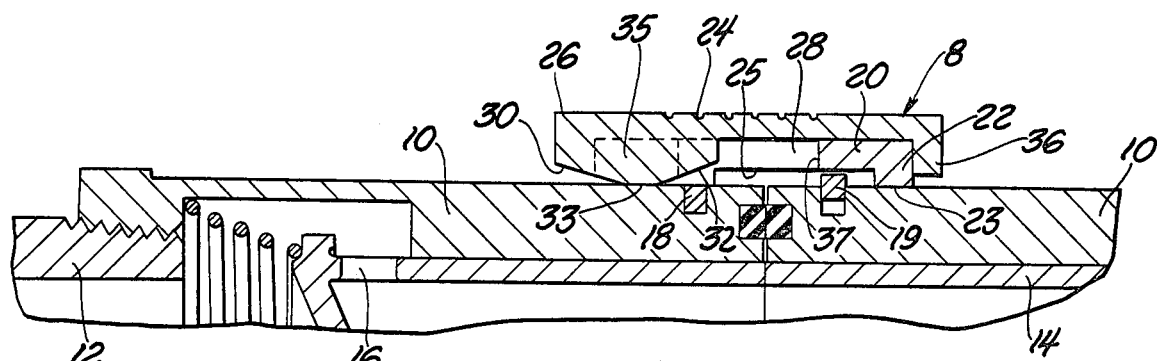
FIGS. 3 and 4 are fragmentary views taken on the same line as FIG. 1, but showing component parts in different conditions of engagement.
Figure 4:
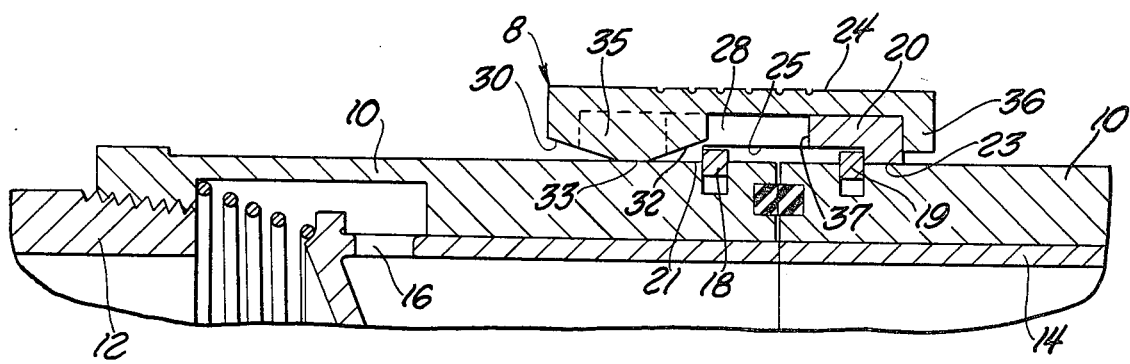
Figure 2:
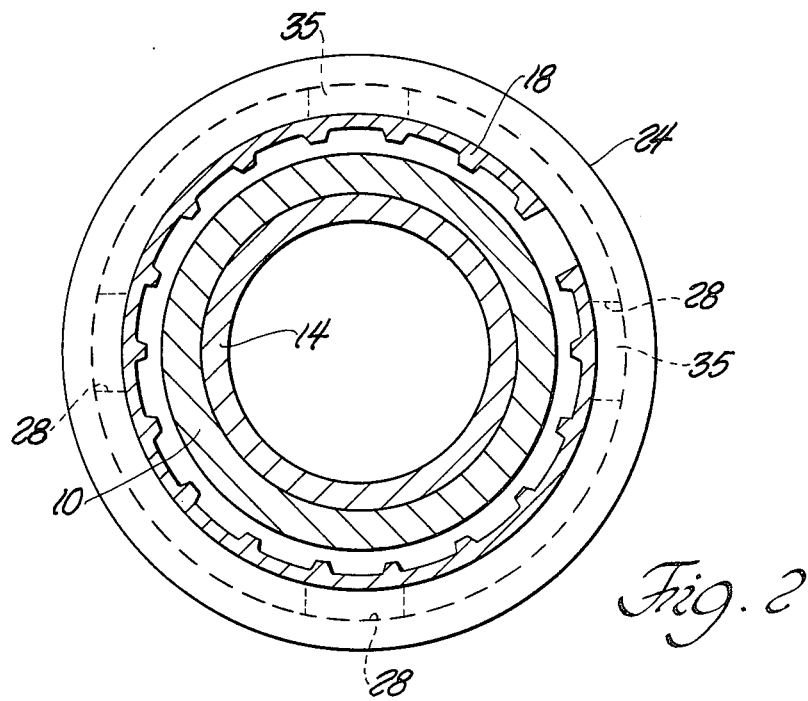
FIG. 2 is a sectional view taken on line 2—2 in FIG. 1.

My improved coupling includes two similar resilient split rings 18 and 19 seated in endless external grooves in the end connectors 10 for outward radial movements from contracted positions contained within the end connector profile to expanded positions projecting outwardly beyond the end connector profile. FIGS. 1, 2 and 4 show the rings in their normal expanded positions; FIG. 3 shows ring 18 in its constrained contracted position. Movement of ring 18 to the expanded position is due to spring force manufactured into the ring. Movement of ring 18 to its contracted position (FIG. 3) is due to the action of cams 30 and 32 incident to axial movement of associated sleeve 24. Ring 19 is shown as a resilient split ring similar to ring 18; however within the broader aspects of my invention ring 19 could be a fixed ring or flange affixed to the associated end connector 10.

The rightmost connector 10 mounts an axially slidable assembly 8 that includes an inner collar 20 and an outer sleeve 24. The internal surface of collar 20 defines a first land area 21, a second land area 23, and an intervening annular groove 25. The axial width of groove 25 is equal to the space circumscribed by rings 18 and 19 when the end connectors are abutted together as shown in FIG. 4. FIG. 4 represents the locked position of the coupling, whereas FIG. 3 represents a transitional condition that occurs during leftward motion of the sleeve 24 - collar 20 assemly. The outer surface of sleeve 24 may be knurled or grooved to facilitate manual grip thereon.

Sleeve 24 includes a first cam 30 and a second cam 32, each having an approcah angle of about twenty degrees measured relative to the surface of end connector 20. Cam surfaces 30 and 32 merge into an intervening axial hold-down surface 33 having the same diameter as end connector 10. The outer tip portion of cam surface 30 is an annular surface, whereas surfaces 32 and 33 are discontinuous surfaces formed by four equi-distantly spaced bars 35 affixed to sleeve 24 for axial movement within slots 28 in collar 22. Movement of sleeve 24 on collar 20 is limited by a flange 36 welded on or screwed into the right end of the sleeve.

To move the coupling to its locked condition the end connectors 10 are moved into abutment with one another, after which a leftward axial force is applied to sleeve 24. As the sleeve 24 - collar 20 assembly moves to the left cam 30 depresses ring 18 radially inwardly to the FIG. 3 condition. Hold-down surface 33 keeps ring 18 in a depressed condition until land area 21 on collar 20 overlies the ring 18 surface. When the assembly reaches the FIG. 4 condition ring 18 snaps outwardly into groove 25, thereby locking the coupling.

The coupling is unlocked by applying a rightward force on sleeve 24. Cam 32 initially depresses ring 18. Surface 33 holds the ring in its depressed condition until bars 35 contact end edges 37 of slots 28. The axial length of surfaces 33 is such that when bars 35 contact the slot end edges 37 surfaces 33 will overlap land area 21, thereby enabling the collar land area to pass rightwardly over the still-depressed ring 18. A continuous rightward force on sleeve 24 will produce the desired unlocking action. No circumferential turning force is necessary. The stroke of sleeve 24 is approximately equal to the combined lengths of surfaces 32 and 33.

FIG. 1 shows in phantom lines a second sleeve-collar assembly 8 located on the leftmost end connector 20. This assembly is identical to the previously-described assembly as regards structure and function. It can be used when the technician is left-handed, or when the other assembly 8 is inaccessible or worn out.

I wish it to be understood that I do not desire to be limited to the exact details of construction shown and described for obvious modifications will occur to a person skilled in the art.

I claim:

1. In association with two separable tubes having similar end connectors (10) adapted to abut one another; improved means for removably joining the end connectors, comprising a first resilient split ring (18), having radial side surfaces seated in an endless external groove in one of the end connectors for outward radial motion from a contracted position contained within the end connector profile to an expanded position projecting outwardly beyond the end connector profile; a second ring (19) having radial side surfaces carried by the other end connector and projecting radially beyond the end connector profile; an axially slidable collar (20) mounted on said other end connector for movement between an inactive position spaced from said first ring to a locking position spanning said first and second rings; the internal surface of the collar defining a first land area (21) at one end of the collar, a second land area (23) at the other end of the collar, and an intervening internal groove (25) that has an axial dimension defined by end surfaces that are axially spaced the same as the distance between the rings when the end connectors are abutted together; the diameter of each land area being less than the diameter of the second ring and the split ring when said split ring is in its expanded condition, said land areas being sized to ride on the outer surfaces of the end connectors the radial side surfaces of the rings and the end surfaces of the internal groove (25) being normal to the longitudinal axis of the end connectors whereby when the rings are located within the groove the nonadjacent side surfaces of the rings will abut the groove end surfaces so that the collar locks the rings and associated end connectors together; and means for depressing said first resilient split ring to enable the collar to move between its inactive position and its locking position; said ring depresser means comprising a sleeve (24) encircling said collar for limited axial movement along the collar outer surface, said sleeve having two opposite divergent internal cam surfaces (30, 32) and an intervening land surface (33) on the end of the sleeve nearest said one end connector, whereby when the sleeve-collar assembly is moved to a position spanning the two end connectors one of said cam surfaces (30) depresses said resilient split ring to its contracted position, the collar being dimensioned so that its first land area (21) passes over said split ring while said split ring is being retained in its depressed position by the aforementioned sleeve land surface (33); the other cam surface (32) being located closely adjacent the resilient split ring when the collar is in its locking position, whereby movement of the sleeve away from said one end connector causes said other cam surface (32) to move over the resilient split ring to depress same to its contracted position, after which the aforementioned land surface (33) holds the resilient split ring in its contracted position while said sleeve moves the collar so that the first land area (21) passes over the split ring.

2. The combination of claim 1: each internal cam surface having an approach angle of approximately twenty degrees measured in relation to the end connector side surface.

3. The combination of claim 1: said colar having a plurality of axial slots spaced around its periphery; the sleeve having internal bars movable within individual ones of the axial slots; the inner surfaces of said bars defining said other cam surface (32) and said intervening land surface (33).

4. The combination of claim 1: the sleeve and collar having coacting motion-limiting surfaces for limiting sleeve motion on the collar to a stroke distance that is approximately equal to the combined length of said other cam surface (32) and said intervening land surface (33).

* * * * *